US009069122B2

(12) United States Patent
Takeuchi et al.

(10) Patent No.: US 9,069,122 B2
(45) Date of Patent: Jun. 30, 2015

(54) CONCAVE LENS ASSEMBLY

(71) Applicant: Go!Foton Holdings, Inc., Somerset, NJ (US)

(72) Inventors: Kenichiro Takeuchi, North Brunswick, NJ (US); Kaneyuki Tsuji, Tokyo (JP)

(73) Assignees: Go!Foton Holdings, Inc., Somerset, NJ (US); Nippon Electric Glass Co., Ltd (JP)

( * ) Notice: Subject to any disclaimer, the term of this patent is extended or adjusted under 35 U.S.C. 154(b) by 0 days.

(21) Appl. No.: 13/799,355

(22) Filed: Mar. 13, 2013

(65) Prior Publication Data

US 2014/0104706 A1 Apr. 17, 2014

Related U.S. Application Data

(60) Provisional application No. 61/849,819, filed on Oct. 12, 2012.

(51) Int. Cl.
| | |
|---|---|
| *G02B 17/00* | (2006.01) |
| *G02B 5/04* | (2006.01) |
| *B29D 11/00* | (2006.01) |
| *B23K 26/06* | (2014.01) |

(Continued)

(52) U.S. Cl.
CPC .............. *G02B 5/04* (2013.01); *G02B 17/0856* (2013.01); *G02B 13/007* (2013.01); *G02B 17/00* (2013.01); *B29D 11/00932* (2013.01); *G02B 17/086* (2013.01); *B23K 26/0648* (2013.01); *B23K 26/0652* (2013.01); *B23K 26/0665* (2013.01)

(58) Field of Classification Search
CPC .... G02B 5/04; G02B 7/1805; G02B 13/0065; G02B 13/007; G02B 17/00; G02B 17/0856; G02B 17/086; G02B 23/08

USPC ................... 359/485.07, 489.09, 726, 833
See application file for complete search history.

(56) References Cited

U.S. PATENT DOCUMENTS

| | | | | |
|---|---|---|---|---|
| 3,736,060 A | * | 5/1973 | Mayo | 356/124 |
| 4,173,394 A | * | 11/1979 | Clave et al. | 359/669 |
| 4,251,158 A | * | 2/1981 | Kimura | 356/8 |

(Continued)

FOREIGN PATENT DOCUMENTS

| | | |
|---|---|---|
| EP | 0062484 A1 | 10/1982 |
| JP | H0640734 A | 2/1994 |
| JP | 2001170850 A | 6/2001 |

OTHER PUBLICATIONS

Partial International Search Report for Application No. PCT/US2013/064282 dated Dec. 19, 2013.

(Continued)

*Primary Examiner* — Thomas K Pham
*Assistant Examiner* — Nicholas Pasko
(74) *Attorney, Agent, or Firm* — Lerner, David, Littenberg, Krumholz & Mentlik, LLP

(57) ABSTRACT

A method of manufacturing an optical component may include providing a plate formed from a transparent material, cutting depth-wise through a planar surface of the plate along first and second linear directions to define first and second planar surfaces, and cutting depth-wise through the planar surface along a curved direction to define a curved surface such that an optical component is obtained including the first and second planar surfaces and the curved surface extending between an edge of the first planar surface and an edge of the second planar surface.

7 Claims, 3 Drawing Sheets

FIG. 2B

(51) Int. Cl.
*G02B 17/08* (2006.01)
*G02B 13/00* (2006.01)

(56) References Cited

U.S. PATENT DOCUMENTS

| | | | |
|---|---|---|---|
| 4,406,520 A | 9/1983 | Sato | |
| 4,446,768 A | 5/1984 | Sirmans | |
| 5,028,127 A * | 7/1991 | Spitzberg | 351/158 |
| 5,223,983 A * | 6/1993 | Oono et al. | 242/342 |
| 5,331,622 A * | 7/1994 | Ernst et al. | 369/112.2 |
| 5,539,422 A * | 7/1996 | Heacock et al. | 345/8 |
| 5,768,024 A * | 6/1998 | Takahashi | 359/631 |
| 6,055,110 A * | 4/2000 | Kintz et al. | 359/637 |
| 6,278,556 B1 * | 8/2001 | Togino | 359/637 |
| 6,671,461 B2 * | 12/2003 | Tochigi | 396/379 |
| 6,956,995 B1 * | 10/2005 | Shafaat et al. | 385/39 |
| 7,019,909 B2 * | 3/2006 | Yamazaki et al. | 359/633 |
| 7,113,349 B2 * | 9/2006 | Takahashi | 359/726 |
| 7,123,425 B2 * | 10/2006 | Kuba | 359/726 |
| 7,215,455 B2 * | 5/2007 | Matsuoka | 359/211.2 |
| 7,436,599 B2 * | 10/2008 | Mihara et al. | 359/676 |
| 7,515,345 B2 * | 4/2009 | Heimer | 359/630 |
| 7,872,806 B2 * | 1/2011 | Mihara et al. | 359/676 |
| 2002/0030901 A1 * | 3/2002 | Kobayashi et al. | 359/831 |
| 2009/0002857 A1 | 1/2009 | Tokunaga et al. | |
| 2011/0049764 A1 | 3/2011 | Lee et al. | |
| 2011/0137124 A1 * | 6/2011 | Milner et al. | 600/160 |
| 2011/0286115 A1 * | 11/2011 | Nagaoka et al. | 359/733 |

OTHER PUBLICATIONS

International Search Report and Written Opinion for Application No. PCT/US2013/064282 dated Feb. 21, 2014.

* cited by examiner

CONCAVE LENS ASSEMBLY

CROSS-REFERENCE TO RELATED APPLICATIONS

The present application claims priority of U.S. Provisional Application No. 61/849,819, filed Oct. 12, 2012.

FIELD OF THE INVENTION

The present disclosure generally relates to optical devices and systems, and methods of their manufacture. In particular, the present disclosure relates to compensating for astigmatism caused by an optical component of an optical device and system.

BACKGROUND OF THE INVENTION

Optical devices and systems often are used to route an optical signal therethrough, and emit the optical signal so that the emitted optical signal is directed towards a target. For example, an optical device may be used to route light supplied from an optical fiber through several optical components, such as lenses and other transparent elements, for example, transparent glass or plastic tubes, of the device, before emitting the light so the emitted light is focused at a predetermined location external to the device.

In an optical device, the optical properties of optical components through which light is passed or which reflect or refract light may determine transmission characteristics of the light emitted from the optical device. As is well known, light is composed of bundles of rays traveling in two planes, known as tangential and sagittal planes, that are orthogonal to each other. When light travels through an optical component of the optical device, the optical properties and geometry of the outer surfaces of the optical component may cause the two planes of rays of the light emitted from the optical component to have different focal lines or points, which is a condition known as astigmatism.

An optical device often includes an optical component to compensate for astigmatism expected to be caused by another optical component of the device, such that the two planes of rays constituting the light emitted from the optical device may be focused at a same focal point or line. For example, an optical probe that operates to emit light having a focus line or beam waist at a target location external to the probe sometimes includes a transparent tube through which the light is emitted from the probe. The tube of the probe acts as an optical lens that causes astigmatism in the light passing therethrough. The optical probe, therefore, includes another optical component, such as an optical prism, through which the light passes before the light passes through the tube, and which causes astigmatism in the light that compensates for the astigmatism expected to be caused by the tube. The astigmatism caused by the other optical component, thus, provides for the desirable condition that the light emitted from the optical probe has minimal or no astigmatism.

A continuing need exists for an optical component that may compensate for astigmatism caused by another optical component in an optical device and where the optical component can be manufactured with relative ease and at low cost.

BRIEF SUMMARY OF THE INVENTION

A method of manufacturing an optical component may include: providing a plate formed from a transparent material, the plate having a planar surface and a depth, cutting depthwise through the planar surface of the plate along first and second linear directions to define first and second planar surfaces, and cutting depth-wise through the planar surface of the plate along a curved direction to define a curved surface such that an optical component is obtained including the first and second planar surfaces and the curved surface extending between an edge of the first planar surface and an edge of the second planar surface. In an embodiment, the curved surface may extend from the edge of the first planar surface to the edge of the second planar surface.

In an embodiment, an optical component may include generally planar first and second surfaces, and a concave surface. The first surface may be arranged at a predetermined angle relative to the second surface such that, when a light beam enters the optical component at the second surface, the light beam passes through the optical component and is reflected at the first surface. The predetermined angle may be an acute angle, e.g., 45 degrees. The second surface may be mirrored to facilitate reflection of light incident thereon through the optical component.

The concave surface may include generally opposing edges that are spaced apart along an axis extending orthogonally from the second surface and arranged such that light reflected by the first surface is directed towards the concave surface. The generally opposing edges may extend in a direction parallel to a direction that a longitudinal dimension of the concave surface extends, wherein the direction in which the opposing edges extend is orthogonal to the axis extending from the second surface. The concave surface is adapted such that a light beam reflected form the first surface is emitted at the concave surface such that a first portion of the emitted beam in a first plane is focused at a first distance from an imaginary plane extending through the generally opposing edges of the concave surface, and a second portion of the emitted beam in a second plane is focused at a second distance from the imaginary plane, the first distance being greater than the second distance.

An optical system may include a lens system through which a beam of light is transmitted and a first optical component operatively coupled to the lens system. The first optical component may include generally planar first and second surfaces, and a concave surface. The generally planar first and second surfaces may be arranged to reflect the beam of light passing through the optical component at the second surface. The second surface may be at a predetermined angle relative to the first surface. The concave surface may include generally opposing edges that are spaced apart along an orthogonal axis extending through the second surface.

The optical system may also include a second optical component disposed such that a light beam emitted at the concave surface passes through the second optical component. The first and second optical components may be adapted such that, when a light beam passes through the first and second optical components and is emitted from the second optical component, a first astigmatism is caused to the light beam by the first optical component and a second astigmatism is caused to the light beam by the second optical component, the combination of the first and second astigmatisms resulting in the light emitted from the second optical component having substantially no astigmatism.

These and other embodiments of the present disclosure are more fully described with reference to the accompanying figures.

BRIEF DESCRIPTION OF THE DRAWINGS

By way of description only, embodiments of the present disclosure are described herein with reference to the accompanying figures, in which.

DETAILED DESCRIPTION

Figure 1A:
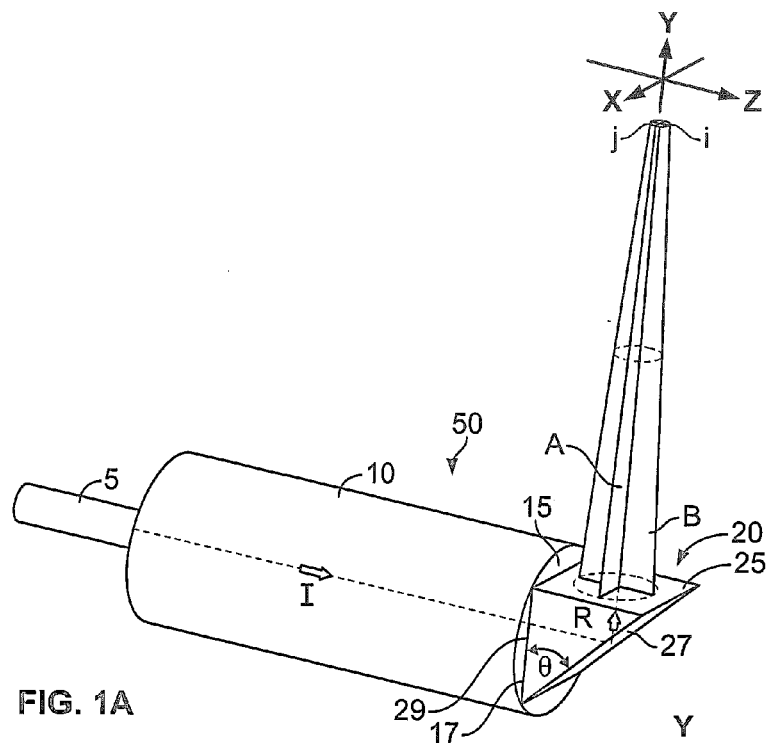
FIG. 1A is a perspective view of an optical assembly.

Particular embodiments of the present disclosure are described with reference to the accompanying figures. In the figures and in the following description, like reference numerals identify similar or identical elements. Unless otherwise indicated, the appended drawings are not drawn to scale.

An x-y-z coordinate system having mutually orthogonal x, y, and z axes is used in FIGS. 1A-3B and referred to in the description below to describe the configuration of optical components of the present disclosure, where the x, y, z axes form planes x-y, x-z, and y-z. In addition, reference is made to x, y, and z axial lines to describe structural features of an optical component extending in a direction parallel to or along the x, y, and z axes, respectively.

Figure 1B:
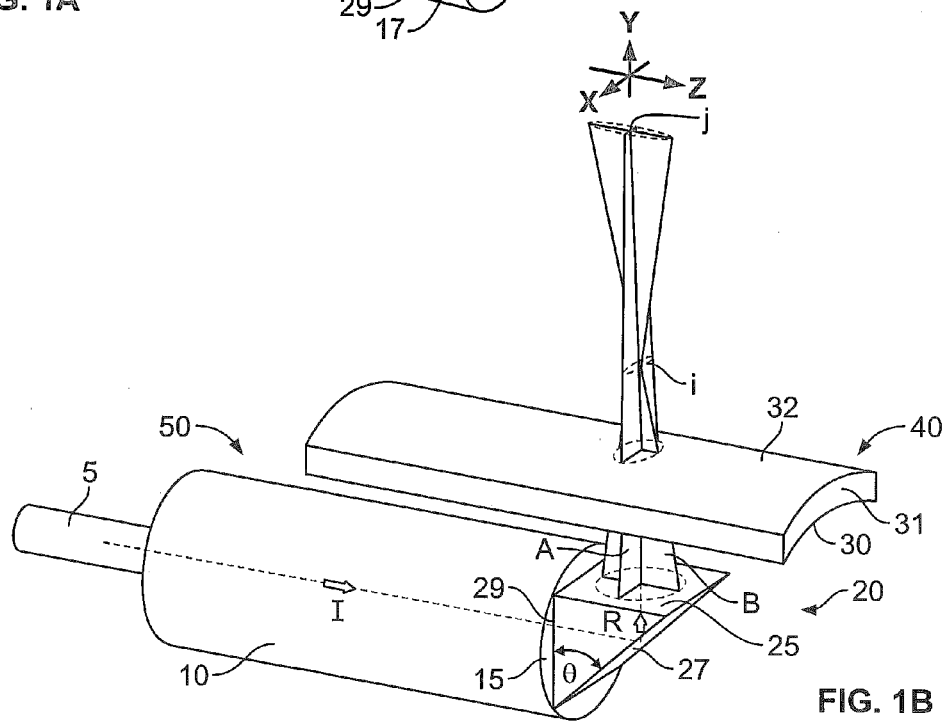
FIG. 1B is a perspective view of the optical assembly of FIG. 1A shown relative to another optical component.

An optical assembly 50 is described with reference to FIGS. 1A and 1B. The optical assembly 50 includes an optical fiber 5, an optical lens system 10 and an optical component or prism 20. The lens system 10 may include one or more optical lenses (not shown) that transmit light supplied from the optical fiber 5 to the optical component 20. The optical component 20 is coupled to the lens system 10 at an optical interface 15. The optical interface 15 is formed by a planar surface 17 of the lens system 10 that faces and is in contact with a planar surface 29 of the optical component 20. The optical component 20 is made of a transparent material, such as plastic or glass, and is configured in the form of a prism having surfaces arranged to reflect and then emit light supplied from the lens system 10 in a predetermined direction.

Referring again to FIGS. 1A-1B, the optical component 20 is in the shape of a triangular prism including the planar surface 29, a planar surface 27, and a planar surface 25. The surface 29 extends in a plane parallel to the x-y plane. The surface 25 extends in a plane parallel to the x-z plane. The surface 27 and the surface 29 define an angle θ, e.g., 45 degrees, therebetween.

The effect the optical component 20 has on light that is passed through the optical component 20 and then emitted from the optical component 20 at the surface 25 is now described. For simplicity, it is assumed that a light beam I supplied from the fiber 5 to the lens system 10 is transmitted by the lens system 10 so that the light beam I is traveling in the z axis direction when incident on the surface 29 of the optical component 20, and that the light beam I incident upon the surface 29 of the optical component 20 does not have astigmatism. The light beam I incident on the surface 29 travels through the optical component 20 in the direction of the z-axis to the planar surface 27. Based on the angle of incidence of the light beam I at the surface 27, which is at an angle θ relative to surface 29, the surface 27 reflects the beam I in the direction R, where the direction R is generally in the y-axis direction, toward the surface 25. The reflected light beam I is then emitted from the optical component 20 at the surface 25. It is further assumed that the reflected light beam I that is emitted at the surface 25 does not have astigmatism.

The light beam I that is emitted from the optical component 20 at the surface 25 is formed from rays traveling in the orthogonal x-y and y-z planes, as represented by the planar shapes A, B, respectively. As shown in FIG. 1A, since the surface 25 is planar, i.e., not curved, the beam waists j, i, i.e., the location at which the spot size of the beam is at a minimum, in the x-y plane (planar shape A) and y-z plane (planar shape B), respectively, are at the same position.

Positioning a transparent element 40, e.g., a lens, in the path of the light emitted from the optical component 20 at the surface 25 may have an effect upon the emitted light, where the effect depends on the shape and optical properties of the element 40. As shown in FIG. 1B, a transparent element 40, such as a concave lens having concave shaped surfaces 30 and 32, may be positioned over the surface 25 of the optical component 20 such that the reflected light emitted at the surface 25 passes through the surface 30, portion 31 of the lens 40 between the surfaces 30 and 32, and then is emitted from the element 40 at the surface 32. As shown in FIG. 1B, after the light emitted at the surface 25 passes through the concave lens 40, the beam waist i in the y-z plane (shape B) is closer to the surface 25 than the beam waist j in the x-y plane (shape A).

The effect that a lens, which has curved surfaces, such as concave lens 40, and is external to a first optical component of an optical device, and through which light emitted from the first optical component passes, has upon the light emitted from the first optical component, may be compensated for by having the light pass through another, second optical component with a curved surface, i.e., another lens, of the optical device before the light is emitted from the first optical component of the optical device toward the external lens. As discussed above (see FIG. 1B), the curved shape of the surfaces 30 and 32 of the lens 40 may cause the light emitted from the optical component 20 to have astigmatism.

By providing another, second optical component in the form of a lens with curved surfaces through which light passes before being emitted from a first optical component of an optical device toward an external lens, astigmatism may be caused in the light emitted from the first optical component to compensate for the astigmatism caused by the external lens, such that the light ultimately emitted from an optical system including the optical device and the external lens has minimal or no astigmatism.

Figure 2A:
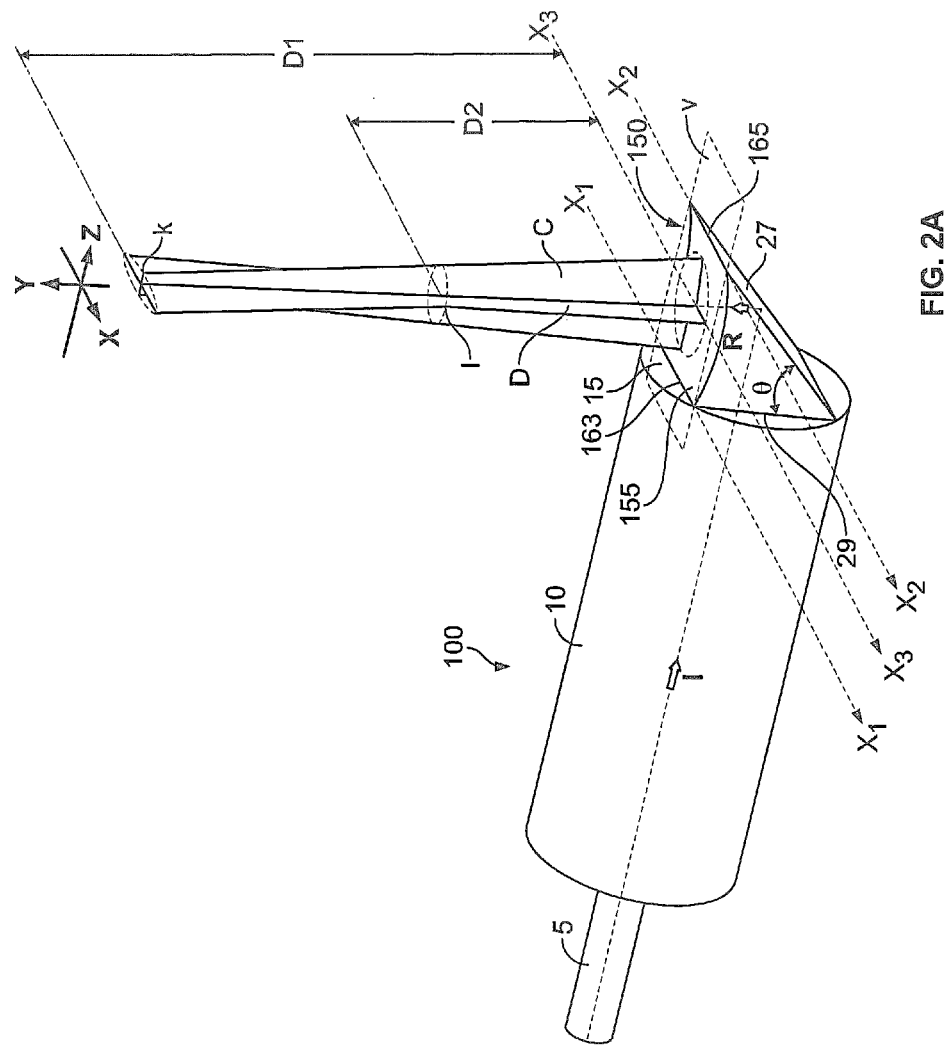
FIG. 2A is a perspective view of another optical assembly with an optical component thereof omitted.
Figure 2B:
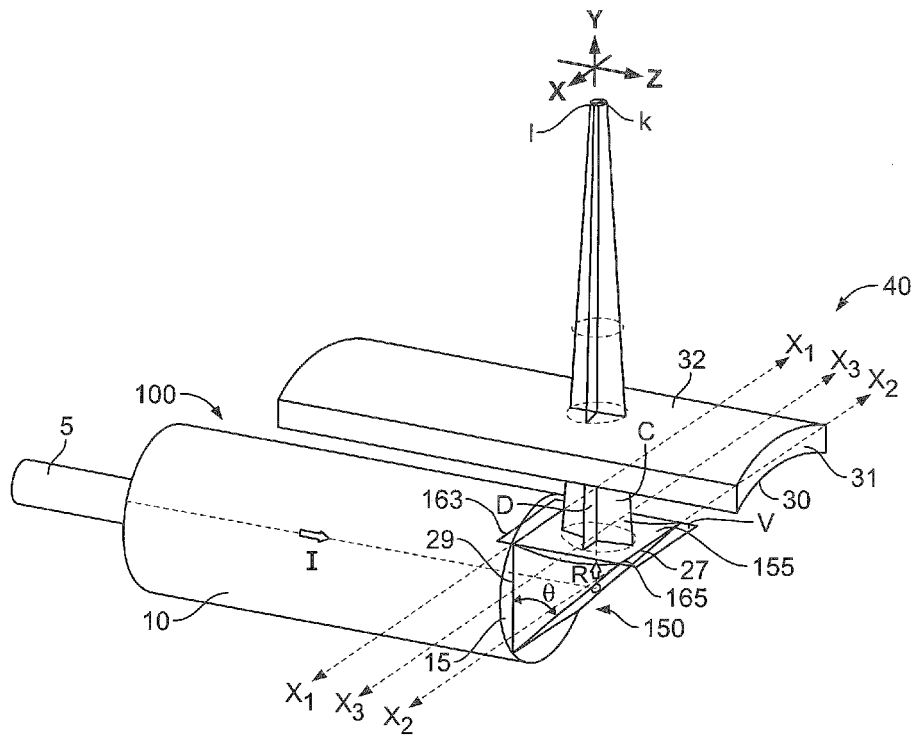
FIG. 2B is a perspective view of the optical assembly of FIG. 2A shown including the optical component omitted from FIG. 2A.

In an embodiment as shown in FIGS. 2A-2B, an optical assembly 100 includes an optical component 150 having a concave surface 155. The optical assembly 100 is substantially similar to the optical assembly 50 with the exception that optical component 20 has been replaced by optical component 150. The optical assembly 100 includes optical fiber 5 and optical lens system 10, as in the optical assembly 50, and the optical component 150. The optical component 150 is similar to the optical component 20 with the exception that the optical component 150 includes the concave surface 155 as opposed to planar surface 25. The optical component 150 is coupled to the lens system 10 at optical interface 15, which is formed by planar surface 17 that contacts planar surface 29 of the optical component 150.

The concave surface 155 is a plane curve defined between a first edge 163, which extends in a direction of an axial line x1, and a second edge 165, which extends in a direction of an axial line x2. The plane curve of the surface 155 extends in a negative y-axis direction from each of the first and second edges 163, 165, forming a concave surface that bulges inwardly in a direction away from an imaginary x-z plane V, which extends through the edges 163, 165 of the component 150. The concave surface 155 has a longitudinal dimension extending in a direction of the x-axis and an axial line x3 extends through points of greatest depth along the longitudinal length of the concave surface 155. In some embodiments of the optical component 150, the edge 163 of the concave surface 155 is also the edge of the planar surface 29 such that the concave surface 155 and the planar surface 29 share a common edge extending in a straight line, and the edge 165 of the concave surface 155 is also the edge of the planar surface 27 such that the concave surface 155 and the planar surface 27 share a common edge extending in a straight line. Similar to the optical assembly 50, when a light beam I is incident upon the surface 27 of the optical component 25 of the assembly 100, the light beam enters and passes through the component 150 and is reflected by surface 27 in direction R generally in the y-axis direction and toward concave surface 155.

As shown in FIG. 2A, the concave surface 155 is adapted such that the light emitted from the optical component 150 at the surface 155 has the characteristics that the portion of the emitted light that is in the y-z plane (represented by planar shape C) has a beam waist k that is at a first distance D1 from imaginary x-z plane V, and the portion of the emitted light that is in the x-y plane (represented by planar shape D) has a beam waist 1 that is at a second distance D2 from the plane V, where the first distance D1 is greater than the second distance D2. In particular, the portion of the emitted light in the x-y plane (represented by planar shape D) propagates away from the surface 155 as a converging beam portion that converges to the beam waist 1 at the second distance D2, and then propagates as a diverging beam portion from the second distance D2 to distances greater than the second distance D2 from the plane V. In other words, the portion of the emitted light that is in the x-y plane (represented by planar shape D) propagates as a diverging, i.e., widening, beam portion as the distance the beam portion propagates away from a distance D2 from the surface 155 increases. The portion of the emitted light in the y-z plane (represented by planar shape C) propagates away from the surface 155 as a converging beam portion that converges to a beam waist k after propagating a first distance D1 from the plane V, which is a greater distance away from the surface 155 than the distance that the portion of the emitted light in the x-y plane (represented by planar shape D) propagates before converging to the beam waist 1. The first distance D1 from the plane V at which the beam waist k of the portion in the y-z plane is located is a function of the concavity of the surface 155, such that the greater the concavity of the surface 155 in the negative y-axis direction, the greater the first distance D1. Conversely, the lesser the concavity of the surface 155 in the negative y-axis direction, the smaller the first distance D1.

The degree of concavity of the surface 155 may be selected in view of the curvature of surfaces of an external optical component, such as the surfaces 30, 32 of the component 40, through which the light emitted at the surface 155 is to pass through, such that the light emitted from the optical component 150 and then passes through the external component 40 is emitted from the component 40 with minimal or no astigmatism.

As shown in FIG. 2B, the component 150 may be provided with the curved surface 155 such that the beam waists k, l in the y-z plane (planar shape C) and in the x-y plane (planar shape D) respectively of the light beam I emitted from the lens 40 are at the same distance from the imaginary plane V.

During use, the optical assembly 100 may be used to illuminate objects or structures. Medical uses for the optical assembly 100 may include illuminating internal body structures during a minimally invasive surgical procedure. The optical assembly 100 may be adapted such that the spot size of the light beam emitted from the assembly 100 may correspond with the structures that are desired to be illuminated. In an embodiment, the light beam emitted from the assembly 100 may be elliptical and have a spot size of approximately between 5 and 100 μm. In an embodiment, the assembly 100 may be adapted to provide that the spot size of the emitted light beam may facilitates the illumination and identification of particular cells, e.g., cancer cells.

Figures 3A, 3B:
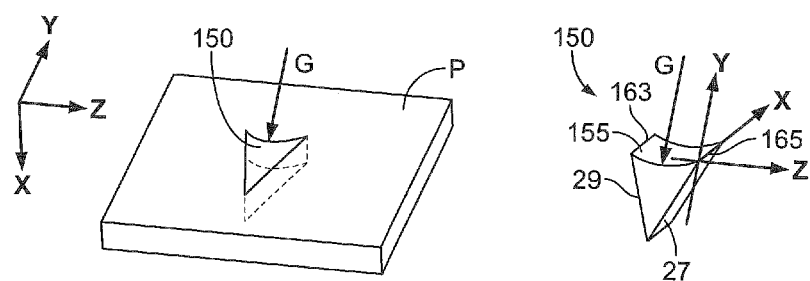
FIG. 3A is a perspective view of a plate from which a prism has been cut, in accordance with an embodiment of the present disclosure.
FIG. 3B is a perspective view of the prism cut from the plate of FIG. 3A.

A method of manufacturing the optical component 150 is described with reference to FIGS. 3A and 3B. As shown in FIG. 3A, a plate P, e.g., a glass or a polymer, is provided. Optical component 150 may be cut from the plate P. The shape of the optical component 150 is formed by cutting the desired shape from the plate P. The planar surfaces 27 and 29 may be formed by using a tool, such as a laser or other cutting instrument, that cuts depth-wise, in a direction of the x axis, into the plate P. Further, the concave surface 155 may be formed by using the same tool and cutting depth-wise into the plate P, in a direction of the x axis, along a desired radius of curvature G. The shape of the optical component 150, thus, may be completely formed by cutting only depth-wise, in a direction of the x axis, into the plate P. The manufacture of the optical component 150 is easily performed simply by cutting depth-wise into the plate, and there is no need to perform any further cutting or shaping after removal of the optical component 150 from the plate P, following such cutting.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical system comprising:
   a lens system through which a beam of light is transmitted; and
   a first optical component operatively coupled to the lens system, the first optical component comprising:
      generally planar first and second surfaces, wherein the first surface is arranged at a predetermined angle relative to the second surface such that, when a beam of light enters the optical component at the second surface, the light beam passes through the optical component and is reflected at the first surface; and
      a concave surface curving inwardly and including generally opposing first and second edges, the generally opposing first and second edges being spaced apart and extending along respective first and second axes, the first axis confronting or co-extensive with the second surface, the concave surface arranged such that light reflected by the first surface is directed towards the concave surface,
      wherein an imaginary plane extends through the generally opposing first and second edges, and wherein the concave surface is adapted such that a light beam reflected from the first surface through an interior of the optical component to the concave surface is emitted at the concave surface such that a first portion of the emitted beam in a first plane has a beam waist at a first distance from the imaginary plane and a second portion of the emitted beam in a second plane has a beam waist at a second distance from the imaginary plane, the first distance being greater than the second distance.

2. The optical system of claim 1, wherein the generally opposing first and second edges extend in a direction parallel to a direction that a longitudinal dimension of the concave surface extends, wherein the direction in which the opposing first and second edges extend is orthogonal to an axis extending away orthogonally from the second surface.

3. The optical system of claim 1, wherein the predetermined angle is acute.

4. The optical system of claim 1, wherein the predetermined angle is 45 degrees.

5. The optical system of claim 1, wherein the first surface is reflective to facilitate reflection of light incident thereon through the optical component.

6. The optical system of claim 1 further comprising a second optical component disposed such that a light beam emitted at the concave surface passes through the second optical component.

7. The optical system of claim 6, wherein the first and second optical components are adapted such that, when a light beam passes through the first and second optical components and is emitted from the second optical component, a first astigmatism is caused to the light beam by the first optical component and a second astigmatism is caused to the light beam by the second optical component, a combination of the first and second astigmatisms resulting in the light emitted from the second optical component having substantially no astigmatism.

* * * * *